United States Patent [19]

Davio et al.

[11] Patent Number: 5,001,753
[45] Date of Patent: Mar. 19, 1991

[54] CRYTOGRAPHIC SYSTEM AND PROCESS AND ITS APPLICATION

[75] Inventors: Marc Davio, Ohain, Belgium; Philippe Gautier, L'Hay Les Roses, France; Willem Isphording, Chatenay-Malabry, France; Jean-Jacques Quisquater, Rhode-St-Geneèse, Belgium; Herve Sizabuire, Bagneux, France

[73] Assignee: U.S. Philips Corporation, New York, N.Y.

[21] Appl. No.: 164,674

[22] Filed: Mar. 7, 1988

[30] Foreign Application Priority Data

Mar. 6, 1987 [FR] France ................. 87 03083

[51] Int. Cl.$^5$ .......................... H04L 9/06; H04L 9/28
[52] U.S. Cl. ........................................ 380/29; 380/23; 380/24; 380/28; 380/42; 380/50; 235/379; 235/380; 340/825.34
[58] Field of Search ............... 380/29, 36, 37, 42, 380/44, 49, 50, 24, 23, 25, 28; 235/379, 380; 340/825.31, 825.34

[56] References Cited

U.S. PATENT DOCUMENTS

| 4,259,720 | 3/1981 | Campbell | 380/24 |
| 4,274,085 | 6/1981 | Marino, Jr. | 380/29 |
| 4,275,265 | 6/1981 | Davida et al. | 380/29 |
| 4,751,733 | 6/1988 | Delayaye et al. | 380/42 |

OTHER PUBLICATIONS

John D. Lenk, "Handbook of Microprocessors, Microcomputer, & Minicomputers", (Prentice-Hall, 1979; Section 1-9-4, pp. 36-37).

Primary Examiner—Stephen C. Buczinski
Assistant Examiner—Bernarr Earl Gregory
Attorney, Agent, or Firm—Jack D. Slobod

[57] ABSTRACT

The subject of the present invention is a cryptographic system, having two inverse permutations, which can be implemented in a (micro) computer whose data processing resources are relatively limited. The two inverse permutations are processed with one and the same table, and the data zones, before and after permutation, occupy only one and the same memory zone. Applied to the DES cryptographic system, this can in particular be implemented in the memory card for the purpose of ensuring the security of transmissions between the card and a communication system; in particular the card reader of this system.

4 Claims, 2 Drawing Sheets

CRYTOGRAPHIC SYSTEM AND PROCESS AND ITS APPLICATION

BACKGROUND TO THE INVENTION

The present invention relates to a cryptographic system including a computer whose program memory is programmed for processing information according to a reversible encoding-decoding process, which process includes at least two permutations in opposite directions to each other, the information to be processed comprising "p" bits to be permuted, each permutation being predefined by a definition table stored in an area of the program memory, said definition table comprising "p" table positions, each table position containing, for each of the "p" bits to be permuted respectively, an indicator value to directly indicate the new location of an associated bit after permutation, such that on the one hand each indicator value is, "a pointer to" a table position and on the other hand each table position is, "point at by" an indicator value of the table.

Encoding-decoding systems are used to ensure the security of the storage and/or the transmission of information which must remain confidential both for the sender, the encoder, and for the addressee, the decoder. The principle of security depends on the fact that an encoded information is, a priori, incomprehensible and useless to a person who is not authorized and does not know the key.

The encoding-decoding technique consists in defining an algorithmic process for processing confidential information. Presently known data processing means have become more and more complex because the speed of data processing enables a more complex authorized encoding-decoding process than with other means. On the other hand a non-authorized person is capable of using data processing for rapidly carrying out multiple deciphering attempts with the objective of reconstituting the encoded information.

A cryptographic process including two mutually inverse permutations is described in the publication "Advances in Cryptology, Proceedings of Crypto 83, Edited by David Chaum, University of California, Santa Barbara, Calif." particularly pages 171 to 202 "Analytical Characteristics of the DES" by Marc Davio et al. A relevant process is described in page 189 and the following pages; for more information on cryptography, this publication also includes a large bibliography, pages 199 to 202.

In a computer a cryptographic process is embodied in a program whose execution requires known resources such as the instruction set of the computer, registers, the random access memory, the read only memory; these resources are also used by other programs, for example by the programs which use, or even which create in clear, the confidential information.

Because of the complexity of the processes, the data processing resources necessary for their execution have become very large such that, despite all the attention which has been given to this problem, certain computers, particularly microcomputers, do not have a sufficient capacity to be able to include a decoding process.

A typical example of this regrettable situation is the memory card; the memory card together with its memory card reader is today a standardized product comprising a microcomputer of relatively limited capacity; for banking applications of the memory card it has not yet been possible to have an encoding procedure embodied in the memory of the card; because of this, the encoding can only be carried out in the memory card reader which raises problems of security during the transmission of information between the reader and the card itself.

The object of the present invention is to overcome this disadvantage by considerably reducing the data processing resources necessary for the execution of a cryptographic process in such a way that the said process can be included in a (micro) computer of limited capacity, without substantially increasing the duration of its execution by so doing.

SUMMARY OF THE INVENTION

According to the present invention, a cryptographic system is particularly characterized in that the program memory contains only one single and unique definition table for predefining the two permutations which are the inverse of each other, and in that said single table is constituted by any one of said two permutation tables of which each of the "p" table positions also includes a block indicator, and in that the said single table is divided into "b" individually numbered blocks. Each block includes "v" indicative values ("b" and "v" being such that "b·v=p"), each indicative value then being located in one of said blocks whose individual number is known. For each position of the considered table, the block indicator respectively indicates the individual number of the block which contains the indicative value "pointed to" by considered table position; thus each table position is also, indirectly by means of its own block indicator, actively "pointed towards" the table position which is pointing to it.

Thus it is possible to save the memory location normally occupied by one of the two tables without losing the information provided by so doing since this can be retrieved by means of the block indicator added in the single table.

However it is necessary to ensure that the block indicator does not cause a substantial increase in the size of the table.

For this purpose, using a computer working with binary words of "y" bits (y being an integer), each indicative value being numbered by means of a number "x" of bits, this number "x" being different by a multiple Ky of "y" (K being an integer), i.e. Ky−x=z (z being an integer), a cryptographic system according to the present invention is particularly characterized in that the "b" blocks are given binary numbers from "0" to "b−1", and in that the number "b" is chosen such that "b" is at most equal to "$2^z$", i.e. "b−1≦$2^z$−1".

Thus it is possible to use bit positions in the table which could not previously be used. Because of this it is possible for the amount of memory occupied by the table not to increase at all despite the additional presence of the block indicator.

In the particular case of the DES cryptographic process such as defined in pages 183 and 184 of the already mentioned publication, the two permutations IP and IP$^{-1}$ which are the inverse of each other are grouped such that one of them is grouped with two P$^{-1}$ permutations and the other with two P permutations; the resultant permutations are hereafter called IP·P$^{-1}$ and P·IP$^{-1}$. They apply to information comprising 64 binary data to be permuted i.e. 64 table positions (p=64); with a computer working with 8-bit binary words (y=8), the cryptographic system applied to the DES process is according to the invention particularly characterized by the said single table for processing IP·P$^{-1}$ and P·IP$^{-1}$ including only 32 table positions. Each "i"$^{th}$ ($1 \leq i \leq 32$) table position containing a single block number and a single indicative value. The single indicative value is used for processing (in one direction) two binary data to be permuted, the "i"$^{th}$ datum and the "$32+i$"$^{th}$ datum respectively, and the single block number is used for processing (in the other direction) the binary data to be permuted, the "2i"$^{th}$ and the "$2i-1$"$^{th}$ and the "$2i-1$"$^{th}$ respectively. The single table is divided into 8 blocks ($b=8$), each of the 32 table positions comprises 8 bits ($y=8$) for containing on the one hand in 3 bits ($z=3$) the block number and on the other hand in 5 bits ($x=5$) the indicative value.

Thus the single table only occupies 32 program memory bytes. This result represents a remarkable saving of data processing resources. In effect, the memory size has been reduced by a factor of 4 since in the prior art 2 tables having 64 bytes each were necessary.

As has been mentioned above, the data processing resources are composed not only of program memory but also of the set of instructions, of registers and of random access memory.

During the processing of a permutation, the information to be processed is necessarily stored in random access memory. In the current state of the technology, for example in the microcomputer used in the memory card, the random access memory is very expensive in that it requires about 1,500 μm$^2$ of silicon per bit of random access memory, while only 110 μm$^2$ of silicon are sufficient per bit of read only memory. It is therefore important to try to reduce the number of random access memory bits.

According to the present invention, a permutation process, to be implemented in a (micro) computer whose accumulator comprises "y" bits, for permuting a first sequence of "p" bits and thus to obtain as a result the permutation of a second sequence of "p" bits, the permutation being defined by an instruction table comprising "p" indicative values Vi ($1 \leq i \leq p$), each "i"$^{th}$ value Vi indicating what is the destination position in the second sequence of the "i"$^{th}$ bit of the first sequence. The permutation thus defined includes at least one cycle of "c" ($1 \leq c \leq p$) values Vi which is looped back on itself, and input point being arbitrarily chosen for each cycle from among the "c" indicative values Vi which comprise it. The first bit sequence is considered as being composed of "m" ("m" being a positive integer) words M of "y" bits ($p=y(m-1)+r$ with $0 \leq r \leq y$)). The permutation process includes, for each cycle, the following steps:

(a) the storage in a memory register of the value Vi of the input point and the transfer to the carry position of the "i"$^{th}$ bit of the first sequence determined by the value "i" of the input point, (b) the loading into the accumulator of the word $M_m$ of the first sequence which contains the bit defined by the content of the memory register, (c) the rotation within itself of the accumulator by a number of bit positions such that the bit defined by the content of the memory register is brought to the end of the word, (d) the rotation with carry of the accumulator by a single bit position in a direction such that on the one hand the bit previously placed at the end of the word is now placed in the carry, and on the other hand the bit previously placed in the carry is entered in the accumulator, (e) rotation of the accumulator within itself by a number of bit positions such that each bit returns to its initial position with the exception of that which is now in the carry position, (f) the unloading of the accumulator in order to return to its position in the first sequence the bit of the word $M_m$ previously sampled in step (b), (g) the searching in the instruction table for that value of Vi whose position i is defined by the content of the said memory register, and storage of the value found in this same memory register, (h) comparison of the content of the memory register with the value Vi of the input point of the cycle in order, in the case of inequality, to continue the cycle processing by returning to step (b), and, in the case of equality, processing the other cycles until the complete permutation is accomplished.

Thus the implementation of the process according to the invention, which uses the carry bit in a new way as a temporary working memory area, enables the occupation of only single random access memory area for the two sequences of "p" bits before and after permutation, since the second sequence is substituted bit by bit for the first sequence during each bit exchange via the carry bit.

In addition it is noted that the permutation process does not use the standard bit management instructions such as: Test Bit, Set Bit, Reset Bit, . . . ; this is an additional advantage as the instruction set of certain microprocessors does not include bit management instructions.

In the case of DES, already mentioned, the information to be permuted comprises 8 bytes (64 bits), the process according to the invention therefore enables a saving of 8 random access memory bytes.

Finally, the implementation of the invention has, as a technical result, a saving of data processing resources.

These characteristics in particular enable the application of DES in the memory card itself and no longer in the memory card reader.

Because of this, in a communication systems including a central computer, a transmission network and memory card readers, each card reader becomes simpler to manufacture since, at the limit, each card reader then has to provide no more than a simple mailbox function.

BRIEF DESCRIPTION OF THE DRAWING

The present invention will be better understood with the help of a non-limiting example of embodiment which is described hereafter with reference to the following Figures.

DETAILED DESCRIPTION OF THE INVENTION

Figure 1:
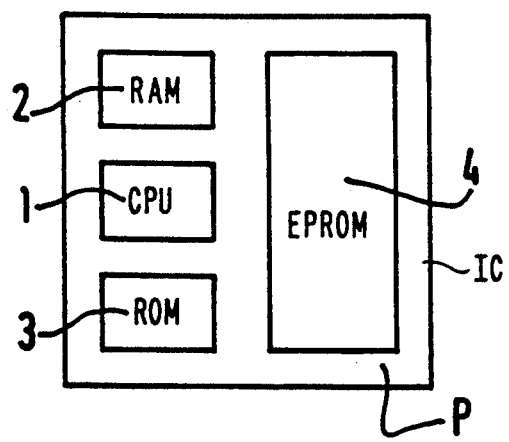
FIG. 1 is a diagram of the functional allocations of the area of a single chip microprocessor which exists commerically (reference ET 1002 of the Thomson company)

FIG. 1 is a diagrammatic representation of a chip P; its total area is for example 25 mm$^2$ which is divided into four zones; zone 1 is the central processing unit (CPU) which occupies a sixth of the area, zone 2 is the random access memory (RAM) which occupies a sixth of the area, zone 3 is the read only memory (ROM) which occupies a sixth of the area, zone 4 is the storage memory of EPROM type which occupies half of the area; the various zones are connected by buses and control lines which are not shown.

Zone 2 has a capacity of 44 bytes.
Zone 3 has a capacity of 2K bytes.
Zone 4 has a capacity of 1K bytes.

This FIG. 1 shows how the random access memory (RAM) is technically expensive to produce since, thinking in memory bytes, a fifth (i.e. 20%) of the area allocated to the memory is used for producing only 1.4% (=44/(44+2K+1K)) of the memory.

The diagram shown in FIG. 1 corresponds to that of the chip referenced "ET 1002" manufactured and sold by the Thomson company. Zone 3 of the read only memory contains the instructions of an executable program which the purchaser must provide in advance for the purpose of producing manufacturing masks personalized in this way.

The final assembly constituted by the chip provided with its program constitutes a data processing machine whose technical performance therefore varies from one purchaser to another.

Any reduction in the number of random access memory bytes used by a processing process therefore provides important technical advantages.

Similarly any reduction in the number of read only memory bytes used for storing the instructions of a processing process provides important technical advantages.

For a banking with memory card, zone 4 (EPROM) is in particular used for storing the transactions progressively as the user uses his card for carrying out, for example, purchases from authorized tradesmen, transfers, etcetera.

In the known encoding machines, a cryptographic process such as DES whose data to be encoded comprise 64 bits, the first and second sequences before and after permutation already by themselves occupy 16 bytes of random access memory, where it is also necessary to have an 8 byte encoding key. Thus, 24 bytes of random access memory are already occupied before having started the processing. The processing itself requires for its storage (instruction+tables+...) some 1.5K bytes of read only memory; these few numerical data explaining why it has been possible up to the present time to implement DES in the card access terminal only and not in the card itself.

Because of this, information exchanges between the card and the terminal cannot benefit from the security provided by the encoding.

Figure 2:
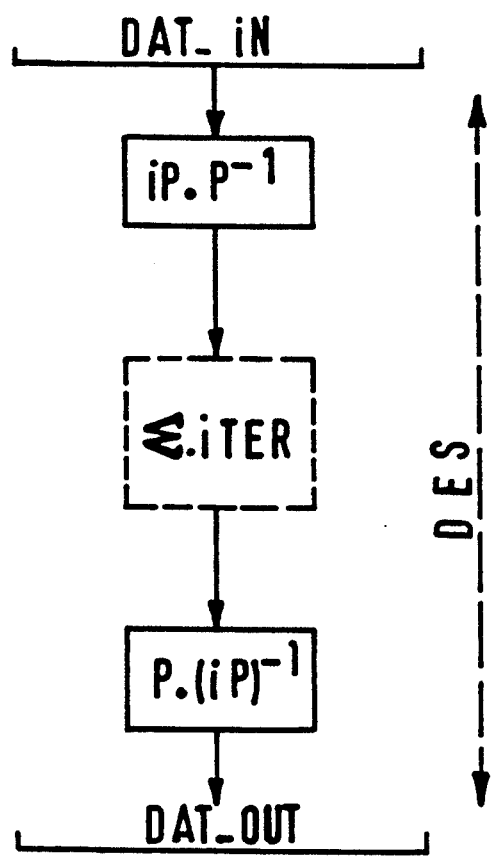
FIG. 2 is a simplified DES diagram.
Figure 3:
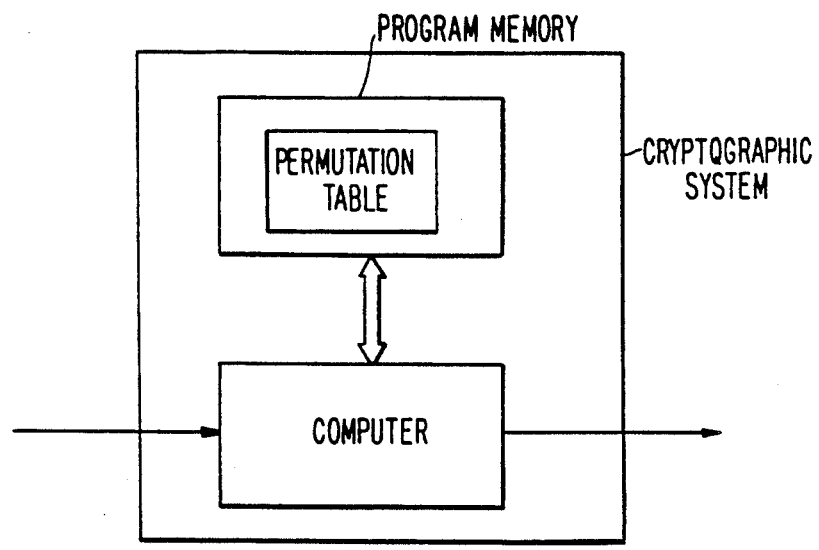
Figure 4:
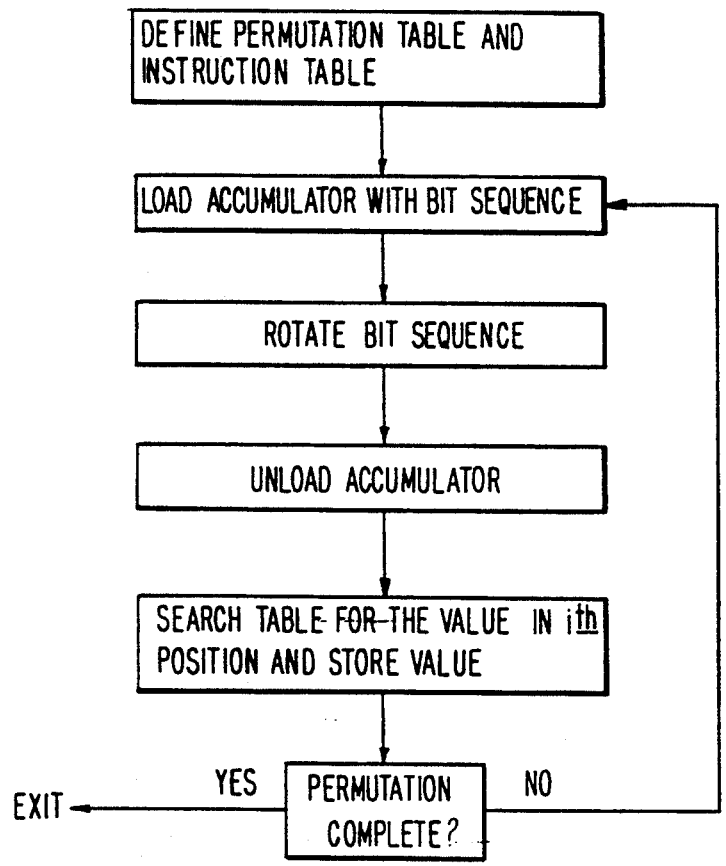

FIG. 2 is a succinct representation of the DES process such as defined in page 183 of the already mentioned publication.

The information to be processed on input DAT-IN undergoes a first permutation IP·P$^{-1}$; it is then operated on by an iterative processing Σ·ITER before again being permuted P·IP$^{-1}$ in order to provide the output data DAT-OUT.

In a reversible process, it is clear that these two permutations are the inverse of each other in that if the first permutation transports the bit No. i to position No. j, then the second permutation transports (or rather "returns") bit No. j to the position No. i. Consider the table for P·IP$^{-1}$. For reasons which will appear later, it is advantageous to encode each bit number, or indicative value, in the form: byte number+bit number in the byte. This results in the permutation definition table; Table I.

TABLE 1

| Byte | Bit 0 | 1 | 2 | 3 | ↓ 4 | 5 | 6 | 7 |
| --- | --- | --- | --- | --- | --- | --- | --- | --- |
| 0 | 73 | 75 | 15 | 17 | 33 | 47 | 61 | 65 |
| 1 | 05 | 03 | 27 | 21 | 67 | 45 | 63 | 71 |
| 2 | 01 | 23 | 77 | 51 | 41 | 37 | 53 | 55 |
| 3 | 07 | 43 | 25 | 11 | 31 | 57 | 13 | 35 |
| 4 | 72 | 74 | 14 | 16 | 32 | 46 | 60 | 64 |
| 5 | 04 | 02 | 26 | 20 | 66 | 44 | 62 | 70 |
| 6 | 00 | 22 | 76 | 50 | 40 | 36 | 52 | 54 |
| 7 | 06 | 42 | 24 | 10 | 30 | 56 | 12 | 34 |

The 64 indicative values of the table are arranged from left to right and from top to bottom in the order of the bit positions before permutation; each value comprises the destination byte number and the destination bit number; for example the bit (2,4) located, before permutation, in bit number 4 of byte number 2 (see the two arrows) corresponds to the value (4,1) of the table (underlined value) which signifies that after permutation the considered bit will be placed in byte number 4 in bit number 1.

It can be seen in this table that the maximum value is (7,7) which corresponds well to the last of the 64 permuted bits which is bit number 7 of byte number 7; it is also noted that this table includes two nearly like cycles for bytes 0-3 and 4-7, respectively.

This table P·IP$^{-1}$ thus shown has two completely remarkable qualities; in effect it can be seen on the one hand that the destination values of each bit of the first 32 bits of the zone to be permuted all have odd values, for the last 32 bits the values are therefore necessarily even values, and on the other hand that the even and odd values, after a translation by 4 bytes downwards, differ exactly by 1. For example the destination value (7,3) of the bit (0,0) is equal, to the nearest 1, to the destination value (7,2) (located four bytes lower) of the bit (4,0) (bit number 0 of byte number 4) and so on.

According to the invention the number of values of the table is therefore divided by 2 which reduces the amount of memory occupied by the table by half.

By retaining, for example, only the 32 odd values, the complete permutation can still be processed. In effect in order to search for the destination position of a bit whose initial location is equal to or greater than (4,0), it is appropriate to subtract (4,0) from the initial location address, to find in the retained half-table the destination value, and to subtract the value 1 from it in order to find the correct destination normally located in the absent half-table. For example: in order to find the destination of the bit (5,2), by subtracting (4,0) there is obtained (1,2) (bit 2 of byte 1) giving the value (2,7) of the table from which 1 is subtracted in order to obtain (2,6) which is the destination of the bit (5,2) (bit 2 of byte 5). The number of values of the table can therefore be divided by 2 without loss of information.

The 32 remaining values all being values of the same parity (even or odd depending on the half-table chosen), the last bit of each value is not significant and, in a preferred embodiment, it may therefore be ignored. It is therefore noted that, for each of the 32 remaining values, only five bits are significant: 3 bits for numbering the 8 destination bytes from 0 to 7, and 2 bits for the bit numbers without the parity bit.

It is known, as mentioned above, that the two DES permutations IP·P$^{-1}$ and P·IP$^{-1}$ are the inverse of each other. In order to define and therefore to actually carry out these two permutations, two tables are generally proposed and used in the known DES's. However only one of the two tables is theoretically sufficient; In effect, on the one hand the single table can be used in a known way in the "forward" direction and, on the other hand, for the "return" direction, i.e. the other permutation, it is possible to carry out a search in the said single table to find which is the position "i" from which the bit "j" has come which enables the bit "j" to be placed in its position. The disadvantage of using only one single table is that the searching in the table is carried out sequentially by the permutation program. Because of this each search will have an average duration corresponding to the duration of the sequential scanning of half of the table which is very long with the known tables comprising 64 values.

The reduction of the table to 32 values, as mentioned above, already enables a speed-up of the search sequence but the speed achieved is not yet sufficient.

According to the invention, the table is considered as constituted of "b" individually numbered blocks, and a return indicator "p" is associated with each "j"$^{th}$ value of the table in order to indicate the number of that one of the blocks of the table which contains the value "j" such that the average search time is divided by "b" since each block then only contains a number of positions equal to the number of positions of the table divided by "b".

Let us take an example by arbitrarily dividing the table 1 above into 4 blocks of 16 values each (n=4). Block 1 contains the values relating to the bytes 0 and 1, block 2 to the bytes 2 and 3, etcetera. From table 1 it is known that, in the forward direction, bit (2,4) (byte 2, bit 4, block 2) will be located in position (4,1) after permutation and in position (4,1) the value (7,4) is found. For the return, the problem is therefore, knowing the bit which is in position (4,1), to find the position of the table which points to this value (4,1). In order to indicate that this value is found in the second block, a return block indicator (p=2) is associated with the value (7,4). The value in this position then becomes (2,7,4) (block 2, byte 7, bit 4), the sequential search will then be limited to 16 values of the second block in which the value (4,1) is located, and the average duration of the search will therefore be one half-block, i.e. 8 values.

According to a preferred embodiment of the invention, the table is considered as constituted of 8 blocks (n=8); in the case of the already described half-table, each block therefore only includes 4 values such that the average duration of the search is now 2 values which is obviously very fast. The choice of n=8 also has the advantage of not increasing the memory size of the half-table; in fact, as mentioned above, each value of the half-table will only include 5 significant bits which leaves, in one memory byte, 3 free bits in which can be placed the return block indicator.

Thus each of the 32 table positions comprises, according to the invention, 8 bits of which 3 bits are for the return block indicator, and 5 bits (3 for the byte number and 2 for the bit number) are for the destination location.

Referring to the known situation which would comprises 2 tables of 64 bytes each, the technical advantage obtained due to the invention is measured by the fact that a single table of 32 bytes is sufficient for carrying out the two permutations without penalizing the execution performance of these permutations and the memory size is divided by 4.

By way of non-limiting example, Table 2 is a form which the half-table according to the invention can take.

TABLE 2

| Byte | Bit | 0 | 1 | 2 | 3 | 4 | 5 | 6 | 7 |
|---|---|---|---|---|---|---|---|---|---|
| | 0 | 9D | 5E | 46 | C7 | CD | F3 | 18 | 1A |
| | 1 | 42 | 81 | CB | 48 | FB | 32 | F9 | BC |
| → | 2 | <u>A0</u> | <u>C9</u> | <u>7F</u> | <u>34</u> | 90 | AF | B5 | F6 |
| | 3 | 23 | 71 | 2A | 64 | 6C | 17 | 05 | 8E |

(a)

| 0 | 1 |
|---|---|
| 2 | 3 |
| <u>4</u> | 5 |
| 6 | 7 |

(b)

Table 2a is shown with its real hexadecimal values; table 2b shows the numbers of the 8blocks in table 2a.

Block 0 contains the 4 values "9D", "5E", "46", "C7"; the first value "9D"=10011101, whose eight bits are numbered from 0 to 7 from left to right, signifies:

bits 0 to 2 = "100" Number of return block, bits 3 to 5 = "111" Number of destination byte bits 6 and 7 = "01" Number (without parity) of the designation bit.

The entries in this table are to be used as follows:

(a) for the "forward" permutation:

the start bits distant from (4,0) correspond, as mentioned above, to the same value of the table 2; for example:

bits (6,4) and (2,4) give the value "90" of the table, namely "1001 0000"; and the following destination location is obtained:

bits 3 to 6 = 100, i.e. byte 4 bits 6 and 7 = 00, i.e. by adding the appropriate parity bit (0 for (6,4), 1 for (2,4)), bit 000 and bit 001, the values (4,0) and (4,1) of table 1 are found again.

For the "return" permutation:

the bits which must go to the positions 2$i$ and 2$i-1$ must necessarily come, as seen in table 1, from two locations distant by 4 bytes. For 2 adjacent bits, the return address is therefore the same, to the nearest 4 bytes. The return block number common to these two adjacent bits must obviously only occupy a single location in the table 2; and the address of this location must easily be found from the address of the 2 adjacent bits.

A preferred embodiment is that of table 2; assume that the return address of the bits (7,2) and (7,3) must be found; in 2 times 3 bits we have (7,2) = 111010

(7,3) = 111011 with the first two bits we have the same value "11", or 3 in decimal with the next three bits we have the same value "101", or 5 in decimal it is determined that the address sought is (3,5) (byte 3, bit 5); at this address, in table2, "17" is found, i.e. 0001 0111 which provides, with the first three bits as mentioned above, the block number sought, namely "000".

Block No 0 of table 2 contains four values: "9D", "5E", "46" and "C7".

Given that table 2 "ignores" the parity bits as mentioned above, it is appropriate to find which of these four values points to the bit (7,1) n=111 01, the value obtained from (7,2) and/or (7,3) by removing the least significant bit); the first value "9D"=100[11101] is that in which the five right hand bits have the value (7,1) which is not the case for the other values:

5E=010[1 1110],46=010[0 0110],C7=110[0 0111];

"9D" beinf at the location (0,0) the two sought are therefore (0,0) and (4,0)=(0,0)+(4,0) which corresponds to the values of table 1 in which (4,0) points to (7,2) and (0,0) points (7,3).

Table 3 shows the permutation process which, according to the invention, results in particular in a reduction of the size of the random access memory necessary for the processing of the permutation.

TABLE 3

| BN | 1 | 2 | 3 | 4 | 5 | 6 | |
|---|---|---|---|---|---|---|---|
| ZE | a | b | c | d | e | f | |
| TA C(i,j) | 3 | 6 | 5 | 1 | 2 | 4 | |
| ZS | d | e | a | f | c | b | |
| 3b1 | a | b | c | d | e | f | RE=c |
| 3b2 | e | f | a | b | c | d | RE=c |
| 3b3 | f | a | b | c | d | c | RE=e |
| 3b4 | a | b | c | d | c | f | RE=e |
| 3b5 | a | e | c | d | c | f | RE=b |
| TAB | 4 | 6 | 5 | 1 | 2 | 3 | |

Table 3a defines a permutation which operates over an input zone (ZE) of 6 bits in order to result in an output zone (ZS) of 6 bits permuted according to the table of definition (TA) of values C(i,j); The number 6 is not limiting and it is clear that the process applies whatever the number of bits to be permuted may be. The 6 bits are, for convenience, numbered (BN) from 1 to 6 as are the values of the table; also for convenience, the bits of the input zone are called a,b,c,d,e,f, in order to facilitate the understanding of the successive steps of the permutation process. The definition table comprises 6 indicative values (3,6,5,1,2,4). Each of the values of the table, for example the third value, which is here equal to 5 (i=3, j=5) indicates that the third bit of the input zone ZE ("c") must be located, after permutation, in position 5 of the output zone. In this example, the table comprises only the six values of "j" which are placed in the correct order of increasing "i"'s, this arrangement is equivalent to a table of pairs C(i,j) of bi-univocal values in i and j.

In order to carry out such a permutation a process according to the invention is explained in table 3b; this process uses the same random access memory zone for the input and output.

Arbitrarily choosing a start bit, for example the third bit of the input zone, namely "c", this bit is initially put in the carry position RE as shown at 3b1. The table indicates that this bit (c) must go to position 5 where the bit "e" is currently located and which must itself go to position 2. The first step is a rotation of bits over thenselves in order to bring the bit "e" to the left end of the word as shown at 3b2, the value of the carry bit not having changed.

The second step is a rotation to the left through the carry by 1 position in order to bring the bit "e" into the carry and to simultaneously bring the carry bit "c" to the end of the word, as shown at 3b3. The third step is a rotation of the bits over themselves in order to bring them to their initial position shown at 3b4. At the end of this first iteration, the bit "c" previously placed in the carry position is in its definitive position, and the bit "e" is now in the carry position. It is clear that this process is iterative. Considering now the fifth value of the table TA(j=2) which concerns the bit "e", the same process will permute "e" and "b" in order to obtain the position shown at 3b5 in which the bit "e" has also come into its definitive position while the bit "b" is now in the carry position.

The described process was started by a rotation to the left by 4 positions but a rotation to the right by 1 position would have enabled the same result to be obtained on condition of consequently adapting the direction and number positions of the following rotations; a rotation to the right by 2 positions would also lead to the position shown in 3b2; these variants do not depart from the scope of the present invention.

With the known microcomputers working with 8 bits, it is necessary to transfer (operation code=Load) the byte which is being worked upon into the accumulator as mentioned above; the operation codes used for thwe implementation of the process are for example; Rotate right/left; Rotate with carry right/left depending on the available instruction set.

By observing the table (TA) of the described example, it can be stated that the iterative process comprises a single cycle namely: (3,5), (5,2), (2,6), (6,4), (4,1), (1,3). After 6 iterations bit N 3 is arrived at again and the permutation is completed; this demonstrates that the input point can be chosen arbitrarily.

With a different table, for example the table TAB of table 3c, the existence of a first cycle is noted, namely: (3, 5), (5,2), (2,6), (6,3) and of a second cycle (1,4), (4,1). The present invention applies no matter what the number of cycles may be, it being understood that this number of cycles is easily derived from a simple observation of the table, which is necessarily known since it is part of the encoding algorithm. In order to carry out a complete permutation it obviously suffices to define an input point for each cycle and to execute as many cycles and iterations as necessary. The end of each cycle is recognized when the input point bit of this cycle is again encountered.

To obtain more information on the cycle concept, reference can be made to the already mentioned publication (Davio) page 190, last paragraph No. 3.

This process of permutation of the bits of input zone within itself has the technical result that the output zone is superimposed on the input zone. In the particular case of DES in which the zone to be permuted comprises 64 bits, it is very advantageous to thus free 64 bits of random access memory.

The bit by bit permutation process is advantageously implemented in DES simultaneously with the single table 32 table positions, instead of 64, including block indicators, in order to process IP·P$^{-1}$ and P·IP$^{-1}$.

This preferred implementation finally results in the data processing resources necessary for the implementation of a DES benefiting from the desired invention, being reduced to 17 bytes of random access memory and less than 77 bytes of program memory. This corresponds with a greater than 50% saving in hardware means.

Because of this, DES can now be implemented in small computers and in particular in memory cards.

Thus the security of a transmission system for banking transactions will be improved by making it feasible to encrypt the information which passes between the card and the card reader.

What is claimed is:

1. In a crytographic system including a computer comprising a program memory and a stored program for carrying out a first permutation function on a sequence of p binary digits and a second permutation function which is the inverse of the first permutation function, the improvement comprising: said program memory having a minimized required capacity fo carrying out said first and second permutation functions by storing a single table having positions within said table arranged in a plurality of mutually exclusive blocks, each of said table positions corresponding to a respective constantly related plurality of original positions of the p binary data digits to eb permuted and each containing an indicative value indicating related destination positions of the binary digits in said plurality of related original positions, after permutation in accordance with said first permutation function, and a return block indicator, indicating, for carrying out said second permutation function, which block has a table position containing an indicative value indicating related destination positions equal to said plurality of related original positions, in order to limit to said indicated block a search to find the table position containing the indicative value indicating said related destination positions.

2. In a crytographic system according to claim 1, said computer has a binary word length of y bits, wherein y is an integer, each indicative value contained in said single table is represented x bits, wherein x differs from y by a value Ky such that $Ky - x = Z$ and K, z are integers, said b blocks of said single table have stored numerical values 0 to $b-1$, and the number b satisfies $b - 1 \leq^z - 1$.

3. In a cryptographic system according to claim 2, said computer is a microcomputer having an accumulator of y bit capacity for permuting a first sequence of p bits, and a memory register, wherein said program memory stores an instruction table of avlues Vi, where $i = 1...p$, ordered in the order of the p bit sequence to be permuted and having a one-to-one correspondence with the p bit sequence to be permuted, each of the values Vi indicating the destination position in the permuted bit sequence of its corresponding bit of the p bit sequence to be permuted, said instruction table of values Vi defining a permutation with at least one cycle of c values Vi, where $i \leq c \leq p$, which loops back on itself, an initial point of the cycle being arbitrarily chosen for each cycle from among the c pairs of bit sequence-instruction table values which comprise it, and the program carrying out the following steps for each cycle: qp1 (a) storing the instruction table value Vi of the first cycle initial point in said memory register and transferring to the carry position the ith bit of the first sequence determined by the value i of the input point;

(b) loading into said accumulator the word Mm of the first sequence which contains the bit defined by the content of said memory register, wherein the word Mm is a y bit subsequence of the first bit sequence, such that $p = y(m-1) + r$ and $0 \leq r \leq y$;

(c) rotating the accumulator content within said accumulator by a number of bit positions such that the bit defined by the content of said memory register is brought to the end of the word;

(d) rotating with carry of the accumulator content by a single bit position in a direction to place in the carry position the bit previously placed at the word end and to enter into said accumulator the bit previosuly placed in the cary position;

(e) rotating the accumulator content within itself by a number of bit positions such that reach bit returns to its initial position except for the bit which is currently in the carry position;

(f) unloading said accumulator to return the bit of the word Mm previoiusly sampled in step b) to its position in the first sequence;

(g) searching said instruction table for that value of Vi having the position i defined by the content of said memory register, and storing the value when found in said memory register;

(h) comparing the content of said memory register with the value Vi of the initial point of the cycle, continuing the cycle processing by returning to step b) if inequality is found, and if equality is found processing the other cycles until the permutation is completed.

4. In a cryptographic system according to claim 1, said computer is a microcomputer having an accumulator of y bit capacity for permuting a first sequence of p bits, and a memory register, wherein said program memory stores an instruction table of values Vi, where $i = 1...p$, ordered in the order of the p bit sequence to be permuted and having a one-to-one correspondence with the p bit sequence to be permuted, each of the values Vi indicating the destination position in the permuted bit sequence of i ts corresponding bit of the p bit sequence to be permuted, said instruction table of values Vi defining a permutation with at least one cycle of c values Vi, where $i \leq c \leq p$, which loops back on itself, an initial point of the cycle being arbtrarily chosen for each cycle from among the c paits of bit sequence-instruction table values which comprise it, and the program carrying out the following steps for each cycle:

(a) storing the instruction table value Vi of the cycle initial point in said memory register and transferring to the carry position the ith bit of the first sequence determined by the value i of the input point;

(b) loading into said accumulator the word Mm of the first sequence which contains the biot defined by the content of said memory register, wherein the word Mm is a y bit subsequence of the first bit sequence, such that $p = y(m-1) + r$ and $0 \leq r \leq y$;

(c) rotating the accumulator content within said accumulator by a number of bit positions such that the bit defined by the content of said memory register is brought to the end of the word;

nd) rotating with carry of the accumulator content by a single bit position in a direction to place in the acrry position the bit previously placed at the word end and to enter into said accumulator the bit previously placed in the carry position;

(e) rotating the accumulator content within itself by a number of bit positions such that each bit returns to its initial position except for the bit which is currently in the carry position;

(f) unloading said accumulator to return the bit of the word Mm previously sampled in step b) to its position in tjhe first sequence;

(g) searching said instruction table for that value of Vi having the position i defined by the content of said memory register, and storing the value when found in said memory register;

(h) comparing the content of said memory register with the value Vi of the initial point of the cycle, continuing the cycle progrssing by returning to step b) of inequality is found, and if equality is found processing the other cycles until the permutation is completed.

* * * * *